United States Patent [19]

Wiesen

[11] Patent Number: 5,362,154
[45] Date of Patent: Nov. 8, 1994

[54] PIVOTING SLIPPER PAD BEARING AND CROSSHEAD MECHANISM

[76] Inventor: Bernard Wiesen, 15 Beach Rd., Great Neck, N.Y. 11023

[21] Appl. No.: 107,253

[22] Filed: Aug. 16, 1993

[51] Int. Cl.$^5$ .............................................. F16C 17/00
[52] U.S. Cl. ...................................... 384/11; 123/56.4
[58] Field of Search ...................... 384/11, 2; 123/588; 417/269; 92/71; 74/60

[56] References Cited

U.S. PATENT DOCUMENTS

| | | | |
|---|---|---|---|
| 1,694,938 | 12/1928 | Harris . | |
| 2,182,213 | 12/1939 | Redrup | 74/60 |
| 2,250,607 | 7/1941 | Sherman . | |
| 2,406,292 | 8/1946 | Hall | 123/58 |
| 2,565,272 | 8/1951 | Sherman | 123/58 |
| 3,006,324 | 10/1961 | Shaw | 121/119 |
| 3,087,768 | 4/1963 | Anderson | 312/263 |
| 3,854,831 | 12/1974 | Gutner | 403/292 |
| 3,864,051 | 2/1975 | Reid | 403/408 |
| 4,554,893 | 11/1985 | Vecellio | 123/41.83 |

FOREIGN PATENT DOCUMENTS 511261 11/1930 Germany .

OTHER PUBLICATIONS

Sherman, Slant Mechanism SAE Jun. 1947 pp. 4, 11, 12 (no date).

*Primary Examiner*—Lenard A. Footland

[57] ABSTRACT

Arrangements are disclosed for a highly improved pivoting slipper pad bearing construction offering a reduction in friction, an increase in efficiency and by virtue of their shape and simplicity of form, may be easily and inexpensively produced. Also a superior crosshead mechanism for swashplate engines, pumps and compressors that features a unique lubrication arrangement that assures low friction and long life.

2 Claims, 7 Drawing Sheets

PIVOTING SLIPPER PAD BEARING AND CROSSHEAD MECHANISM

BACKGROUND—Field of Invention

This invention relates to engines of the axial type, under which designation are included all engines having pistons reciprocating in cylinders which are arranged parallel to the power shaft and specifically to mechanisms actuated by the pistons that convert reciprocating motion to rotary motion by the action of a slipper pad bearing coacting with a swashplate attached to the main shaft.

BACKGROUND—DESCRIPTION OF PRIOR ART

Engines of this general type are not new, and many patents have been issued upon such engines, but engines of this character thus far conceived have generally not proved successful and have been found to have numerous and critical shortcomings which render them unsuitable for practical and commercial usage.

Previously conceived engine designs of this type have failed to provide a practical mechanism for the handling the torque reacting forces as a result of slipper pad and swashplate coaction.

The problems occurring from the torque reactions acting on the pistons and any crosshead mechanism has, until the present, prevented the development of the axial engine.

While the crosshead is the only practical device to handle the torque reaction from the slipper pad and swashplate coaction, the problem that has remained unsolved has been the elimination of wear and friction incident to the components of this device.

Previous crosshead constructions proved inadequate for the proper lubrication of its components. Depending upon primitive means to lubricate the essential elements of the crosshead mechanism, it was impossible to form a continuous hydrodynamic lubricating film of sufficient thickness between the crosshead bearings and the longitudinal guides.

An essential element of the mechanism used to convert reciprocating motion to rotary motion is the slipper pad bearing. Necessary for the transmission of the forces of combustion to the face of the swashplate, these elements have exacting requirements, involving their proper lubrication and construction. Previous arrangements for these elements have lacked the efficiencies that bearings of this type are capable of attaining.

The introduction of oil between the slipper pad and swashplate at the center of pressure of a symmetrical slipper pad allows for the pressing out of the oil film into a thin layer and does not permit the formation of a suitable oil wedge.

Lubrication by spray or splash of the coacting surfaces of the slipper pad and swashplate is unacceptable. In any modern engine design requiring elements this critical to the success of its operation, superior methods must be applied.

Conventional structures manufactured for use as fluid-tight frames, such as engine blocks, transmission cases and the like, particularly for use as prototypes, models, and in cases of limited production, are usually constructed with castings which need extensive machining and finishing. These structures require the design and manufacture of patterns just to deliver the first prototype, which often does not reach production, thereby wasting a great deal of time and expense.

Attempts to substitute castings using welded plates have many disadvantages, since this technique requires the use of skilled labor, is very time consuming and difficult to produce precisely even in limited numbers.

Previous axial engines were difficult to service and repair because of a general inaccessibility to the working components.

To date the only truly soundproofed engines have required a separate structure to inhibit the noise emitted from them.

In general these and other difficulties have militated against engines of this type in spite of their many obvious advantages.

The present invention was conceived to overcome these and other deficiencies and inadequacies of prior devices and provides an improved and novel construction which is commercially practical and usable.

OBJECTS AND ADVANTAGES

Accordingly, several object and advantages of the present invention are:

(a) to provide for the efficient control of the slipper pad and swashplate torque reaction by the use of a unique crosshead guidance mechanism whose novel lubrication arrangement eliminates the wear, vibration, and friction formerly associated with mechanisms of this kind and effectively solves the major problem that has prevented the successful utilization of this engine type;

(b) to provide a crosshead mechanism that is easily manufactured and assembled, with the promise of simple and rapid maintenance, that matches or exceeds the life of the other major components;

(c) to provide an engine offering low friction that provides for an improved lubrication system that effectively reduces the losses due to friction in a novel crosshead mechanism that maintains the movement of the piston rods and pistons in perfect concentricity with the cylinder bores, thus eliminating the high friction associated with piston rock and slap and preventing scoring and scuffing;

(d) to provide a pivoting slipper pad bearing construction that will simulate the conditions of an oil submerged assembly and acquire efficiencies not obtained previously;

(e) to provide a high pressure flow of oil directly under and behind the leading edge of a round pivoting slipper pad that is free to rotate and oscillate and provide means for controlling the flow of oil under pressure through a conduit to the working surface of the slipper pad;

(f) to provide a pivoting slipper pad bearing which is inherently stable in its ability to form the wedge shaped films of lubrication upon which it rides;

(g) to provide a method that allows for the proper lubrication of a pivot and its socket that is part of the overall lubrication system;

(h) to provide an engine frame construction of the type specified in which the parts can be easily and accurately manufactured;

(i) to provide an engine structure of the character specified having the frame and cylinder and shaft supporting surfaces so relatively constructed and arranged that the cylinders and shaft will be accurately located and positioned in the frame;

(j) to provide a unique double lap joint connecting system to assemble extruded struts into a skeletal box frame that permits the entrance holes of its connecting fasteners to be used after assembly as connecting points to attach supporting components and cover plates to complete a structural frame assembly;

(k) to provide a skeletal box frame of high precision providing a fluid-tight rugged frame formed from extruded material presenting a uniform flush exterior, with precise dimensions and smooth flat seamless surfaces prepared for the attachment of cover plates and formers, permitting the assembly of its main components without visually revealing the method of assembly and without the need for special tools;

(l) to provide a unique engine frame assembly with associated sound proofing arrangements, eliminating the need for additional structures, in the interest of reducing cost, simplifying manufacture and assembly and producing a superior product that is totally compatible with its joined components and offers means to attach these components precisely in a uniform manner and in such positions that the operative parts of the engine will be readily accessible;

(m) to provide a simple oil cooler that is an integral part of the engine frame;

(n) to provide a practical, efficient and simple method for introducing a highly pressurized charge into the engine cylinders. These means being so arranged that the passages to the cylinders will be relatively short and direct, with provision for cooling the charge within the engine frame;

(o) to provide a construction for a stepped-piston whereby the piston skirt can be efficiently cooled and lubricated without the problem of overoiling the cylinders, thereby eliminating the high oil consumption that has been associated with pistons of this type;

(p) to provide a piston construction offering minimum bulk and weight for a given piston displacement to produce a strong and rigid piston structure, so as to have the lowest operating stresses and loads on the reciprocating mechanism, whose elements can be easily manufactured of suitable materials;

(q) to provide a piston rod connecting arrangement that eliminates expensive, difficult to manufacture and assemble, ball and socket joints or conventional connecting rods and substitute simple, inexpensive, easily assembled connecting elements for piston rods and crossheads;

(r) the more general object of this invention is to provide a high-output axial engine, combining many new features that contribute greatly to its overall performance, offering easy servicing and long life that combine to form a compact, lightweight and economical to manufacture structure.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE INVENTION

Figure 1:
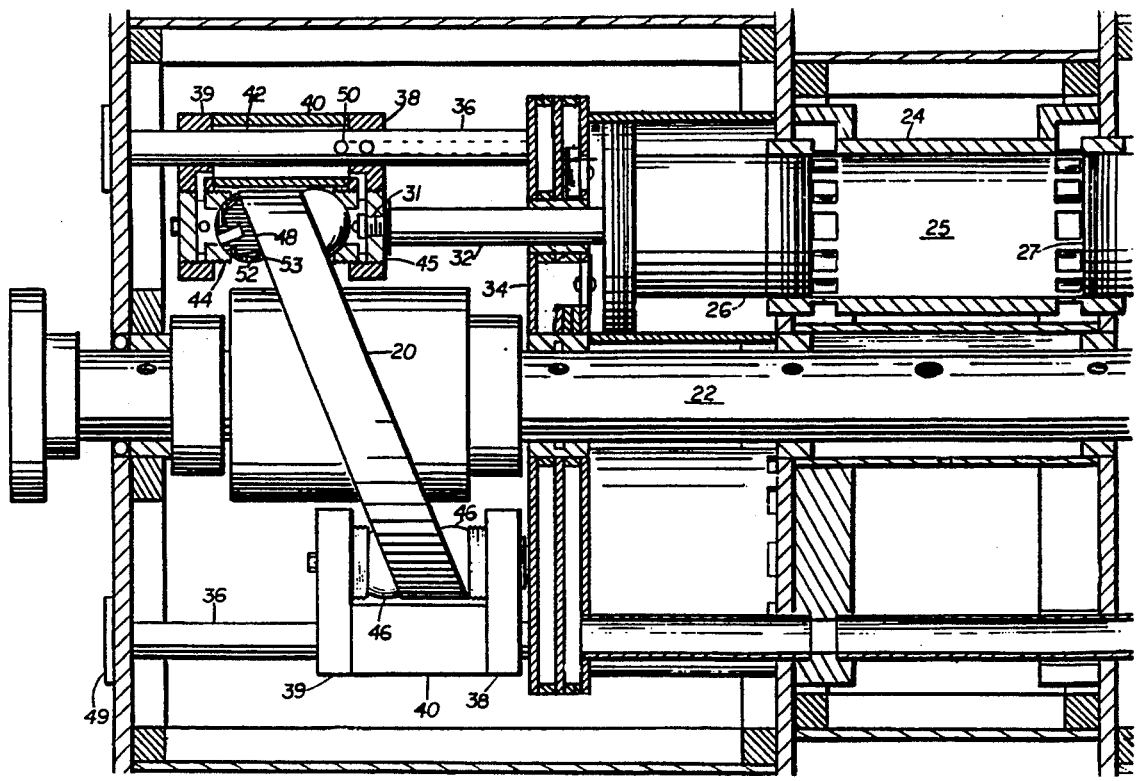
FIG. 1 is a view in section of a multi-cylinder axial engine taken on line 1—1 in FIG. 2 constructed in accordance with the present invention.
Figure 2:
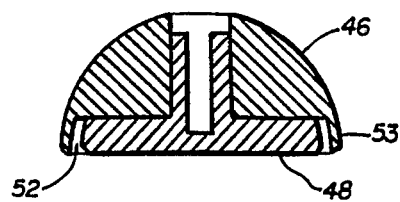
FIG. 2 is a front plan view of the invention constructed in accordance with the present invention.
Figure 3:
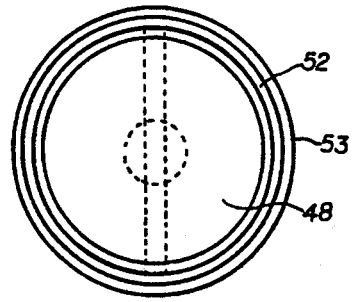
FIG. 3 is a view in section taken on line 3—3 of FIG. 1.
Figure 4:
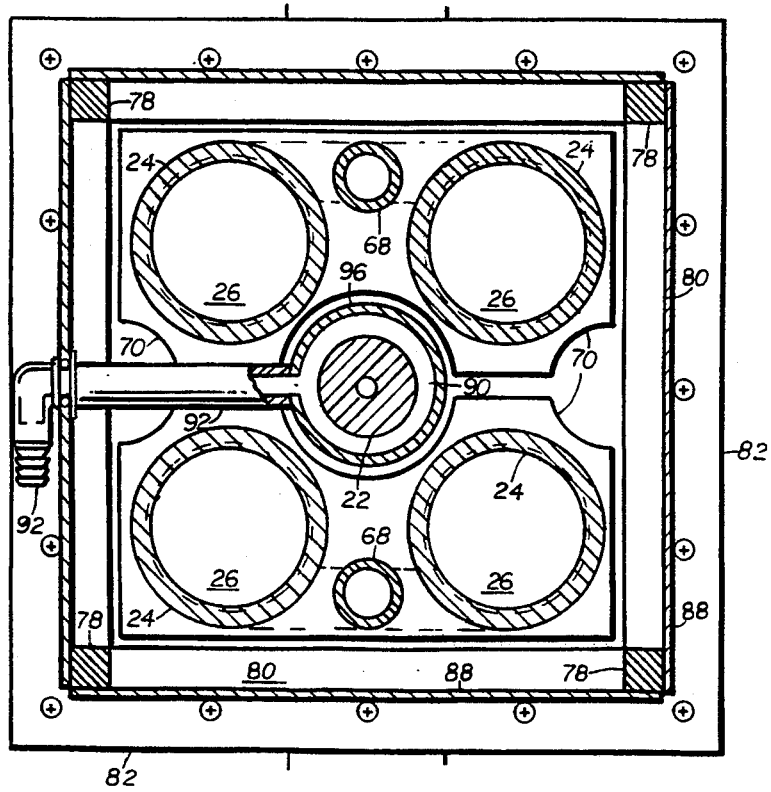
FIG. 4 is a view in section taken on line 4—4 in FIG. 1.
Figure 5:
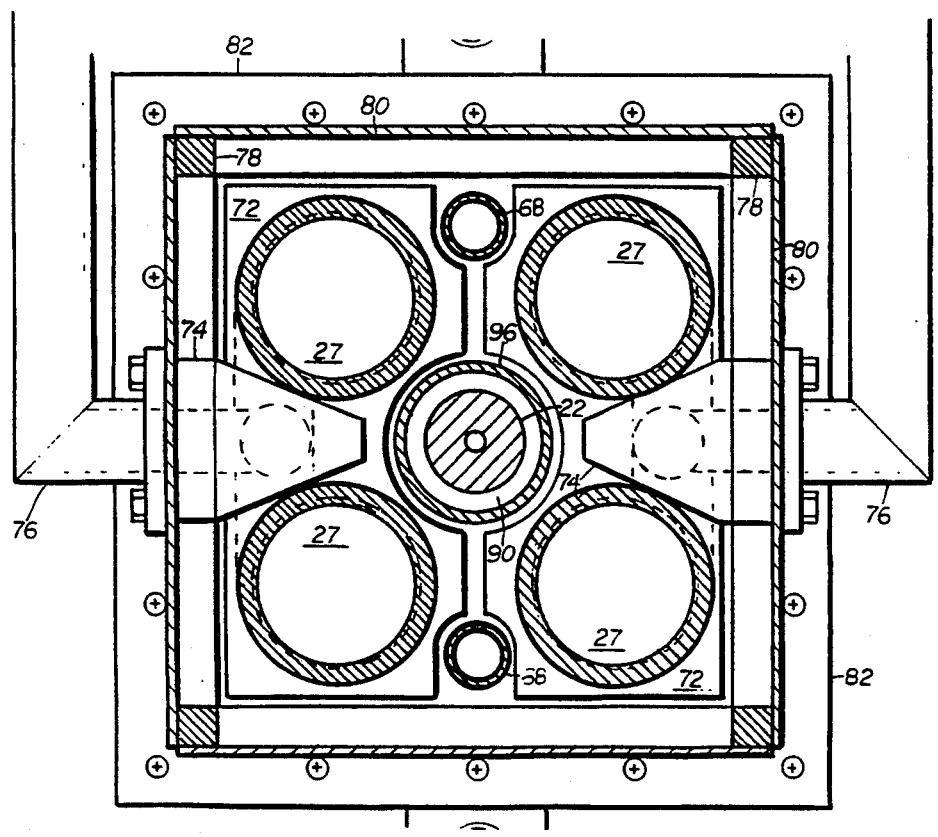
FIG. 5 is a view in section taken on line 5—5 in FIG. 1.
Figure 6:
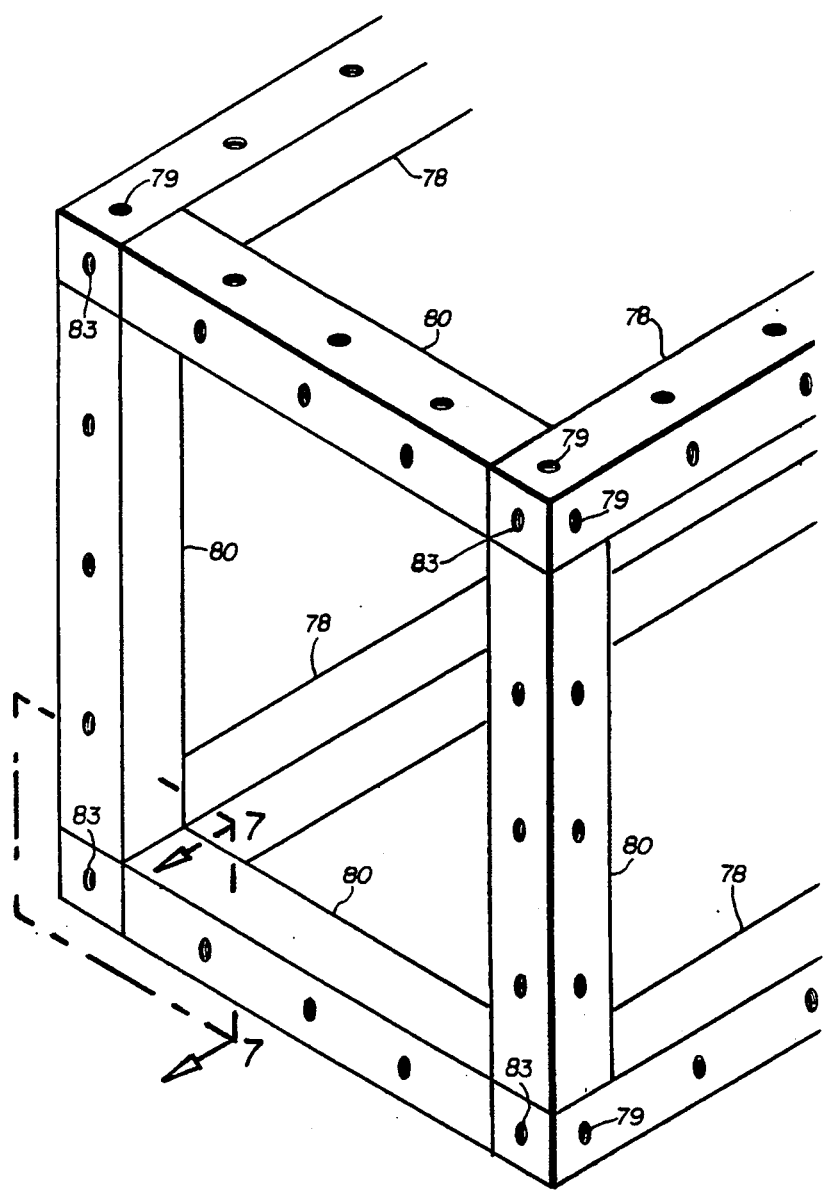
FIG. 6 is a partial perspective view of a skeletal box frame illustrating the double lap joint formed at each corner in accordance with the present invention.
Figure 7:
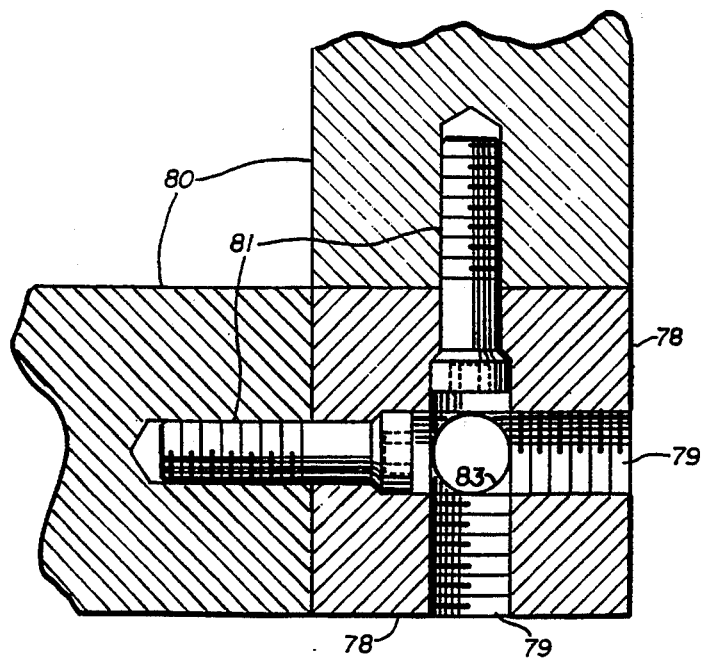
FIG. 7 is a view in section of a corner construction taken on line 7—7 in FIG. 6.
Figure 8:
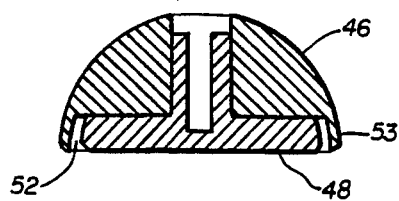
FIG. 8 is a view in section of a pivoting slipper pad bearing assembly constructed in accordance with the present invention.
Figure 9:
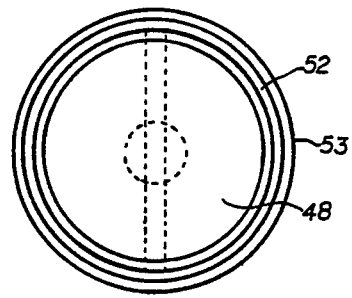
FIG. 9 is a bottom plan view of the structure shown in FIG. 8.

The drawings show an engine in a simplified depiction without placing stress on relatively obvious refinements of portions thereof. Referring to FIGS. 1-9 inclusive, a swashplate 20 may be operably connected to a shaft 22 as disclosed in applicant's U.S. Pat. No. 5,083,532 titled "Mechanism for Variable Compression Ratio Axial Engines." Power cylinders 24, are arranged parallel to shaft 22 with a pair of opposing power pistons 26 and 27 occupying each end of power cylinder 24 with a combustion chamber 25 located between power pistons 26 and 27. Arranged adjacent opposite ends of each power piston 26 and 27 are compressor pistons 30 and operating in compressor cylinders 28, compressor cylinder ports 33 permit the flow of oil mist into compressor cylinder 28 allowing for the lubrication and cooling of power pistons 26 and 27 and preventing the overoiling of the power cylinder 24. Compressor head 34 seals ends of compressor cylinders 28 with studs 29 with a piston rod 32 passing through compressor head 34 connecting compressor piston 30 with a fastener 31 in a socket 45 mounted in a crosshead bearing plate 38. A second crosshead bearing plate 39 is joined with crosshead bearing plate 38 with fasteners (not shown) with a bridge 40 between them. Bridge 40 encloses a reciprocating reservoir 42 with crosshead guide rods 36 passing freely through reciprocating reservoir 42 with crosshead bearing plates 38 and 39 forming a sliding bearing surface around guide rods 36. A lubricant pathway 50 leading from the engine lubricating circuit permits the flow of lubricant through pathway 50 to reciprocating reservoir 42 to socket 45 on through a pivot 46 to a circular orifice 52 formed by a shroud 53 encircling a slipper pad bearing 40 whose flat surface communicates with the flat surface of swashplate 20.

A socket 44 is adjustable in an axial direction mounted in crosshead bearing plate 39. Socket 44 also holds a pivot 46 and slipper pad bearing 48, that communicates with the opposite surface of swashplate 20. Crosshead guide rods 36 are secured by guide rod plates 49. Four axial struts 78 are joined at the ends of eight radial struts 80 with fasteners 81 whose heads are a slip fit in the threaded entrance holes 79 joining fasteners 81 to ends of radial struts 80, to form a six-sided skeletal box frame whose dimensions are defined axially by formers 82. Axial opening 83 is also threaded (thread not shown) to receive screw fasteners connecting former 82 to axial strut 78. Three such assemblies are used to enclosed and support the engines major parts and components. Cover plates 88 are employed to strengthen the assembly and are available as covers and access openings to all internal components. A pump (not shown) pumps oil through oil fitting 92 to oil reservoir 90 which encircles shaft 22 between formers 82 in coolant jacket 96, cooled oil then travels through opening 101 in shaft 22 for distribution throughout engine. As oil travels through engine under pressure it passes through the various bearings and into oil collector elbows 102 to an oil collector tube 103. Air is forced through turbochargers 54 to intake tube 56 into a windchest 58, past one-way spring valves 60 into compressor cylinders 28. As compressor piston 30 compresses the charge in compressor cylinder 28 charge is forced through a spring valve 64 into pressure chamber 62 and on through a transfer tube 68 into intake manifold 70, through intake ports 71. Charge is compressed between power pistons 26 and 27 and at the proper time fuel is injected by injector 99 causing a large pressure increase due to the ensuing combustion of fuel that forces power pistons 26 and 27 apart, opening exhaust ports 75 permitting exhaust gasses to enter exhaust manifold 72, into exhaust elbow 74 and through exhaust pipe 76 into turbocharger 54, thus completing the engine cycle.

OPERATION

Experience has shown that the only respectable machine elements used to properly control the forces of torque reaction resulting from swashplate slipper coaction has been a crosshead mechanism using round guide rods attached on each side of the swashplate. The negative features of this arrangement included high frictional loses, complicated connecting means for the piston rods and their dependence upon the oil spray in the engine case for lubrication. The success of such a mechanism depends on the efficiency (or the absence of undue friction and wear) of the crosshead as it travels on its guiding surfaces.

This invention takes advantage of the rotating and twisting motion of the guide bearing plates 38 and 39, and allows for the formation of an oil wedge that is continuously renewed under pressure from the reciprocating reservoir 42 between the guide bearing plates 38 and 39. In this way, the maintenance of the oil film is made independent of the reciprocating movements of the crosshead. The piston rod 32 is connected to the socket 45 in the crosshead bearing plate 38 with fastener 31. The fastener 31 has a very small radial and axial clearance in its bore in socket 45. The crosshead has only a very small oscillating movement. The continuity of the motion is favorable to good bearing action and the release of loading at the beginning of the compression stroke enables an oil film between piston rod 32, socket 45 and fastener 31 to be continuously replenished.

The pivoting slipper pad bearing is actually two bearings forming a single device. A bearing at one end is a partial ball or pivot that is held in a socket to restrain it, yet permitting universal movement. At the other end is a flat pad that communicates with the flat surface of a swashplate or runner that is mounted on a rotating shaft.

The original intent of its inventors, Michell and Kingsbury was that these bearings be used submerged in an oil bath, and in that arrangement they proved to be extremely efficient and durable. When Michell chose to employ these bearings and have them coact with a swashplate for his "crankless engines" it was believed that the only practical way of lubricating them was by spraying or splashing oil against the swashplate. Other methods have since been tried, that included the introduction of oil from an orifice at the center of the pad. This method fails to properly tilt the pad and lift it to a height that would produce an efficient and continuous oil wedge. As originally conceived the bearing rode upon a thick oil wedge that was responsible for its success. The slipper pad bearing disclosed in this invention successfully simulates the conditions found in an oil submerged assembly. The flow of oil under pressure to the socket 45 assures the proper lubrication of the pivot 46. It is the oil under pressure filling circular orifice 52 that is maintained in position by the shroud 53 that encircles the edge of the round slipper pad bearing 48 that simulates an oil submerged assembly permitting the slipper pad bearing 48 to properly tilt insuring the formation of a suitably thick oil wedge between the slipper pad bearing 48 and the surface of the swashplate 20. It should be understood that these assemblies may be adapted to carry radial loads only, or a combination of thrust and radial loads simply by arranging a complimentary profile of the slipper pad and shroud for the proper embracement of the supported shaft.

The present invention benefits from a high pressure lubrication system that feeds a crosshead and slipper pad assembly that heretofore has not existed in axial engines.

A strong and lightweight skeletal frame structure of low production cost, consisting essentially of stock extrusions combined with simple plate material to produce an engine frame, whereby the shaft, swashplates, pistons, cylinders, bearings and the reciprocating mechanism, may be readily assembled or removed through any of the frame openings.

An outstanding feature of the invention is the concept of a skeletal frame and its unique method of assembly. The skeletal frame is assembled with two types of extruded struts of identical profile and simple screw fasteners that benefits from a unique double lap Joint corner assembly arrangement. Formers 82 are employed to connect and define a plurality of frame assemblies. Each skeletal box frame consists of two types of strut members. Four axial struts 78 are joined with the ends of eight radial struts 80 that are at right angles to one another. The corner joining fasteners 81 which are concealed within the axial strut 78 that laps the ends of two radial struts 80. The threaded portion of the fasteners 81 passes through the axial strut 78 and screws into end holes in the two radial struts 80 at its end. The heads of these fasteners 81 are just small enough (a slip fit) to pass through the minor diameter of the threaded entrance hole 79 in the axial strut 78, but properly shaped to align with the countersink which defines the depth of travel of fastener 81 and permit its threaded portion to engage the end of radial strut 80 at right angles to it. The fasteners 81 are located so as to allow for the use of another fastener (not shown) to pass between the heads of fastener 81 in threaded opening 83 when the frame is assembled. An outstanding feature of the present invention is that the corner connecting arrangement forms an extremely strong assembly which is concealed, and for practical purposes, invisible. The inside corners are neat and show no trace of any connection and permit the use of its entrance holes, (that are threaded) to be used for fasteners that mount cover plates 88, formers 82 and other elements. In addition to the ease of manufacture and finish, is the advantage of easy assembly. The invention provides a maximum of rigidity and strength and produces a robust skeletal structure that permits an extremely accurate frame assembly that cannot be matched by any other fabrication method, and without the need for additional components. Cover plates 88 made of or combined with noise attenuating material may be employed. Never has an engine frame been so constructed as to so easily allow for the complete embracement of its structure and contents with such materials.

Although the description above contains many specificities, these should not be construed as limiting the scope of the invention but as merely providing illustrations of the presently preferred embodiments of this invention. For example, the unique frame structure and assembly method produce an extremely accurate product. The struts may be extruded with the center holes partly formed, with other openings formed axially to further lighten the assemblies. Therefore it should not be considered exclusively for use as an engine frame, but might be appropriately extended to other uses, such as transmission cases, gear boxes and in other areas where a rugged and simple to assemble structure can be an economic alternative. The struts 78 and 80 can be made in a variety of sizes and sold in kit form, with special fasteners 81 whereby frame components can be shipped unassembled at reduced cost and assembled without the need for special tools.

The pivoting slipper bearings disclosed are able to accommodate themselves to the variables of load, speed and viscosity of lubricant, making them usable in regular thrust and radial bearing assemblies and, with properly formed slippers and shrouds, are probably the most efficient round slipper bearings now known.

Thus the scope of the invention should be determined by the appended claims and their legal equivalents, rather than by the examples given.

The embodiments of the invention for which an exclusive property or privilege is claimed are defined as follows.

I claim:

1. A round slipper pad bearing assembly comprising a pivot combined with a round slipper pad bearing, with said round slipper pad bearing constructed to conform with an aligning surface that permits the formation of a wedge-shaped film of lubricant between said slipper pad bearing and said aligning surface that maintains the proper relationship of the moving element to the stationary element, with a circular shroud formed around said round slipper pad bearing, with said circular shroud defining a circular orifice between said round slipper pad bearing and said circular shroud, with means that permit the flow of a lubricant through said pivot into said circular orifice to simulate the environment found in an oil submerged assembly.

2. A crosshead mechanism to control the torque reacting forces as a result of slipper pad bearing and swashplate coaction, comprising two round guide rods held in axial alignment with cylinders and pistons, two crosshead bearing plates containing bearings that form a sliding contact with said round guide bars with a bridge between each of said crosshead bearing plates with a reciprocating reservoir in said bridge and means to furnish a lubricant under pressure from said guide rods to said reciprocating reservoir to maintain a constantly renewed oil wedge between said guide rods and said bearing plates.

* * * * *